US008285307B2

(12) United States Patent
Weinroth

(10) Patent No.: US 8,285,307 B2
(45) Date of Patent: *Oct. 9, 2012

(54) USING CUSTOMER RELATIONSHIP MANAGEMENT DATA EXHIBITING UNIQUE USER IDENTIFIERS IN A CELLULAR NETWORK FOR CREATING GEO STATISTICAL REPRESENTATIONS OF THE USERS

(75) Inventor: Erez Weinroth, Kfar Saba (IL)

(73) Assignee: Brane World Ltd., Kfar Saba (IL)

( * ) Notice: Subject to any disclaimer, the term of this patent is extended or adjusted under 35 U.S.C. 154(b) by 276 days.

This patent is subject to a terminal disclaimer.

(21) Appl. No.: 12/428,073

(22) Filed: Apr. 22, 2009

(65) Prior Publication Data

US 2009/0286554 A1 Nov. 19, 2009

Related U.S. Application Data

(63) Continuation-in-part of application No. 12/365,979, filed on Feb. 5, 2009.

(60) Provisional application No. 61/053,252, filed on May 15, 2008.

(51) Int. Cl.
*H04W 24/00* (2009.01)

(52) U.S. Cl. .................. 455/456.3; 455/437; 455/456.1; 455/433; 370/310.2; 370/328; 370/332; 370/333

(58) Field of Classification Search .................. 455/437, 455/456; 370/310.2, 328, 332, 333; 375/220
See application file for complete search history.

(56) References Cited

U.S. PATENT DOCUMENTS

| 6,636,742 | B1 | 10/2003 | Torkki |
| 6,757,545 | B2 | 6/2004 | Nowak et al. |
| 2001/0036224 | A1 | 11/2001 | Demello |
| 2004/0157640 | A1 | 8/2004 | Pirskanen et al. |
| 2004/0203768 | A1 | 10/2004 | Ylitalo |
| 2004/0235464 | A1 | 11/2004 | Korkalo |
| 2008/0070550 | A1 | 3/2008 | Hose |

OTHER PUBLICATIONS

International Search Report of the International Searching Authority for PCT/IL2009/000487 dated Nov. 11, 2009.
Written Opinion of the International Searching Authority for PCT/IL2009/000487 dated Nov. 11, 2009.
Office Action issued on Sep. 6, 2011 in U.S. Appl. No. 12/365,979.

*Primary Examiner* — Amancio Gonzalez
(74) *Attorney, Agent, or Firm* — The Law Office of Michael E. Kondoudis

(57) ABSTRACT

A computer implemented data processing system for using customer relationship management (CRM) data exhibiting unique user identifiers in a cellular network for creating geo-statistical representations of the users. The system is arranged to: repeatedly identify all network-connected devices which are both active and idle in each location area using the unique identifier; repeatedly create a table for all location areas, each table exhibiting: location area identifier, unique user identifier, time of inflow to the location area, time of outflow from the location area; and differentiate table of time N–1 over table of time N thereby detecting inflow outflow quantities of unique identifiers for each location area; decipher the difference table by the authentication center of the network; analyze the deciphered tables using CRM profiles; and join over time, the deciphered tables with corresponding location area thereby creating at least one GIS data layer.

3 Claims, 3 Drawing Sheets

USING CUSTOMER RELATIONSHIP MANAGEMENT DATA EXHIBITING UNIQUE USER IDENTIFIERS IN A CELLULAR NETWORK FOR CREATING GEO STATISTICAL REPRESENTATIONS OF THE USERS

CROSS-REFERENCE TO RELATED APPLICATIONS

The present application claims the benefit under 35 U.S.C. §119(e) and §120 to and through each of, and is a continuation-in-part of application Ser. No. 12/365,979 filed on Feb. 5, 2009, which in turn claimed the benefit of application Ser. No. 61/053,252 filed on May 15, 2008, the content of both applications is incorporated by reference herein it its entirety.

BACKGROUND

1. Technical Field

The present invention relates to the field of user-based cellular networks, and more particularly, to the extraction of tempo-spatial data related to users of such networks.

2. Discussion of the Related Art

Prior to setting forth the background of the related art, it may be helpful to set forth definitions of certain terms that will be used hereinafter.

The term "user-based cellular network" as used herein in this application, is defined as any network that is based upon geographical partition of space into cells. Each cell is provided with at least one base station, being the end point of the network, which may communicate with specific network-connected devices operatively associated with users. Cellular networks may comprise cellular wireless communication networks for mobile telephony, wireless internet network such as Wi-Fi and Wi-Max. Additionally, these networks further comprise network of payment points in stores and businesses and a network of automated teller machines.

The term "user equipment" (UE) as used herein in this application, is any network-connected device uniquely affiliated with a particular user and therefore associated with the particular user related data, or user profile. These network-connected devices may be, but are not limited to: cellular phones, personal device accessories (PDA), portable computers with wireless connectivity (WiFi, WiMax etc.), payment cards (credit cards, debit cards, electronic money cards) with location identifiers and Radio frequency identification (RFID) tags.

The term "client relationship management" (CRM) as used herein in this application, is defined as the processes a company uses to track and organize its contacts with its current and prospective customers. CRM software is used to support these processes; the software system can be accessed, and information about customers and customer interactions can be entered, stored and accessed by employees in different company departments. Typical CRM goals are to improve services provided to customers, and to use customer contact information for targeted marketing. CRM data refers to sales, marketing, customer service, customer profile or any details on any customer contacts stored in the system.

Traditionally, statistics methods or any large scale marketing research are considered human labor intensive, expensive and extensive, time consuming. Further limitations are that these statistics researches are made with a relative small sample, and non up-to date or non available for small granularity of time-space units. Such obstacles results in a non accurate space relate data with time stamp that highly differ from the transaction time of the database.

BRIEF SUMMARY

According to one aspect of the invention there is provided a computer implemented data processing system for using customer relationship management (CRM) data exhibiting unique user identifiers in a cellular network comprising a plurality of location areas and further in operative association with network-connected devices associated with users, for creating geo-statistical representations of the users, the system comprising: a network-connected devices identifier; a CRM data categorizer; and a location-based combiner. The network-connected devices identifier is arranged to: repeatedly identify, every a first time period, all network-connected devices which are both active and idle in each location area using the unique identifier; repeatedly create a table, every a second time period comprising a plurality of the first time period, for all location areas, each table exhibiting: location area identifier, unique user identifier, time of inflow to the location area, time of outflow from the location area; and differentiate table of time N−1 over table of time N thereby detecting inflow outflow quantities of unique identifiers for each location area; and wherein the CRM data categorizer is arranged to: decipher the difference table by the authentication center of the network; and analyze the deciphered tables using CRM profiles; and wherein the location-based combiner is arranged to join over time, the deciphered tables with corresponding location area thereby creating at least one GIS data layer.

According to another aspect of the invention there is provided a method of using customer relationship management data exhibiting unique user identifiers in a cellular network comprising a plurality of location areas and further in operative association with network-connected devices associated with users, for creating geo-statistical representations of the users, the method comprising: repeatedly identifying, every a first time period, all network-connected devices which are both active and idle in each location area using the unique identifier; repeatedly creating a table, every a second time period comprising a plurality of the first time period, for all location areas, each table exhibiting: location area identifier, unique user identifier, time of inflow to the location area, time of outflow from the location area; differentiating table of time N−1 over table of time N thereby detecting inflow outflow quantities of unique identifiers for each location area; deciphering the difference table by the authentication center of the network; and analyzing the deciphered tables using CRM profiles.

According to yet another aspect of the invention there is provided a computer program product, comprising a computer usable medium having a computer readable program code embodied therein, the computer readable program code adapted to be executed to implement a method of using customer relationship management data exhibiting unique user identifiers in a cellular network comprising a plurality of location areas and further in operative association with network-connected devices associated with users, for creating geo-statistical representations of the users, the method comprising: repeatedly identifying, every a first time period, all network-connected devices which are both active and idle in each location area using the unique identifier; repeatedly creating a table, every a second time period comprising a plurality of the first time period, for all location areas, each table exhibiting: location area identifier, unique user identifier, time of inflow to the location area, time of outflow from the location area; differentiating table of time N−1 over table of time N thereby detecting inflow outflow quantities of unique identifiers for each location area; deciphering the difference table by the authentication center of the network; analyzing the deciphered tables using CRM profiles.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

In the accompanying drawings.

Figure 1:
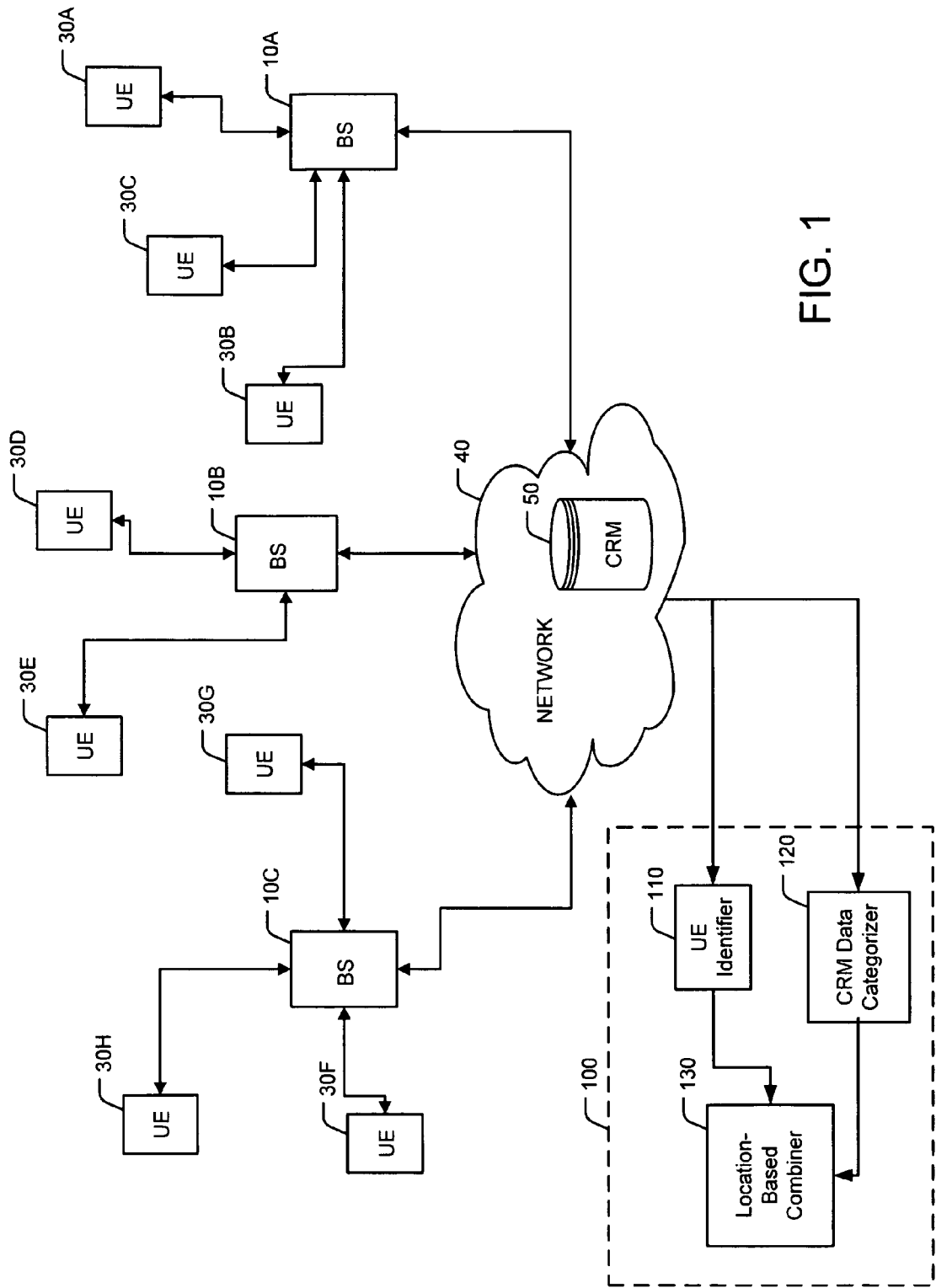
FIG. 1 is a high level schematic block diagram of a user-based network in communication with the data processing system according to some embodiments of the invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Embodiments of the present invention provides combining customer's group's profiles data derived from the network's customer relationship management (CRM) with physical network signals and estimated locations of the corresponding users in order to create spatio-temporal demographic patterns. In embodiments of the invention there is provided combination and aggregation by locations and customer's group's profiles of the data enquired via network-connected device acting as cellular data agents over the end point of the network periodically over predefined time intervals. The raw data is interpolated using geo-statistical method and results are calibrated to create spatio-temporal demographic patterns data sets.

FIG. 1 is a high level schematic block diagram of a cellular network in communication with the data processing system according to some embodiments of the invention. Data processing system 100 comprises user equipment (UE) identifier 110, a customer relationship management (CRM) categorizer 120 and a location-based combiner 130. Data processing system 100 communicates with cellular network 40 which communicates with a plurality of user equipments (network-connected devices associated with particular users) 30A-30F via a plurality of base stations 10A, 10B and 10C, being the end points of network 40.

In operation, data processing system 100 combines and aggregates locations and profiles classes of the data extracted from network-connected devices 30A-30F via the network and in view of the geographic location of the cells, repeatedly over predefined time intervals. Data processing system 100 then interpolates and overlays geo-statistically and calibrates the data into tempo-spatial network-connected users masses patterns representations.

According to some embodiments of the invention, data processing system 100 enables to locate the position of a specific provider (or roaming) UE and describe it by a tracing system.

According to some embodiments of the invention, data processing system 100 aggregates any camped UE (idle or non-idle) in view of geographic locations in order to create tempo-spatial UE masses patterns. Specifically, data processing system 100 is configured in associated operation with any wireless network where User Equipment (UE) communicates with a radio access network (RAN). Data processing system 100 determines and records the number of any idle or non idle UE in each cell sector (location area), aggregate the combined data by provider code into cellular provider's segments; aggregates by UE location area coordinates and segments, thereby creating anonymous aggregated masses that has geographical locations. Then, by repeating the aforementioned aggregation with predefined time intervals, data processing system 100 creates tempo-spatial data stamps. Later, data processing system 100 may create, using geo-statistical methods, geographic information system (GIS) layers of the aforementioned data.

In many user-based networks, upon connection to a network, the identity of a network-connected device must be authenticated for data security reasons. In Global System for Mobile Communications (GSM), for example, the authentication process is based on a challenge response process, wherein the network sends the Subscriber Identity Module (SIM) installed in the user equipment a random challenge. The user equipment replies with a response according to calculations based on the random challenge and a secret key known only by the authentication center of the network and the SIM. The response of the random challenge and the secret key is calculated in the authentication center also. If the responses calculated by the SIM and the authentication center are identical, mobile subscriber authenticity has been established by the authentication process.

According to the present invention, there is provided a method of determining the number of idle user equipment units in each cell. The focus is specifically on idle user equipment units as these units are updating their location in predefined intervals, while user equipment units which are both active and idle are constantly updating thus creating multiple signaling that has to be ignored. Embodiments of the present invention provide a method of counting the idle user equipment units in any cell taking into account the location update and the constant inflow and out flow of users in regards to each particular cell. In GSM, for example, location update (LU)

strategy can handle all the cell phones which have been turned on and in idle status and all the cells within the GSM network are grouped into a number of disjointed location areas (LA).

Usually, there are three reasons which can cause one new location update record, and the information can be obtained from an interface of cellular network: A cell phone updates its location once it enters another new location area from the old location area, and it is termed as static location update (SLU); A cell phone updates its location periodically every pre-specified time interval, and the time period is determined by the wireless carriers, and it is termed as timer-based location update (TLU); A cell phone updates its location when it ends its on-going call after traversing the boundary of location area, or turns on cell phone, or sends a short message.

Figure 2:
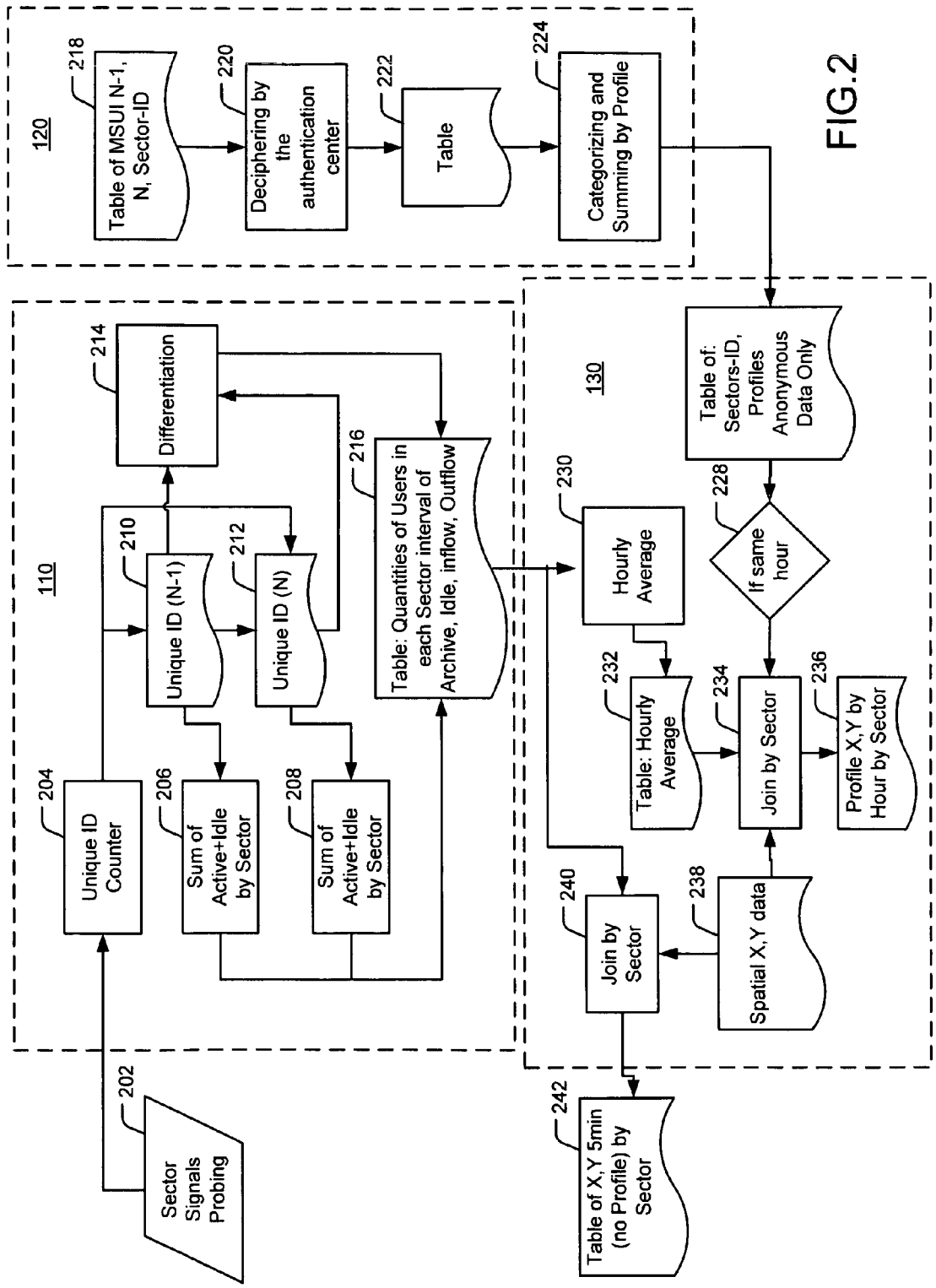
FIG. 2 is a combined data flow and data structure of the data processing system according to some embodiments of the invention.

FIG. 2 is a high level combined data flow diagram and block diagram showing how unique identifiers of user equipment from the CRM is used to create aggregated geo statistical presentation of the users in a given cellular network. There is provided a computer implemented data processing system for using customer relationship management (CRM) data exhibiting unique user identifiers in a cellular network comprising a plurality of location areas and further in operative association with network-connected devices associated with users, for creating geo-statistical representations of the users. The system comprising: a network-connected devices identifier 110; a CRM data categorizer 120; and a location-based combiner 130.

In operation, network-connected devices identifier 110 is arranged to: repeatedly identify, every a first time period, all network-connected devices which are both active and idle in each location area using the unique identifier; repeatedly create a table, every a second time period comprising a plurality of the first time period, for all location areas, each table exhibiting: location area identifier, unique user identifier, time of inflow to the location area, time of outflow from the location area; and differentiate table of time N−1 over table of time N thereby detecting inflow outflow quantities of unique identifiers for each location area; and wherein the CRM data categorizer is arranged to: decipher the difference table by the authentication center of the network; and analyze the deciphered tables using CRM profiles. The location-based combiner is further arranged to join over time, the deciphered tables with corresponding location area thereby creating at least one GIS data layer.

According to some embodiments of the invention, the analyzing the deciphered tables using CRM profiles is preceded by categorizing and summing the CRM data by user profiles.

According to some embodiments of the invention, the analyzing the deciphered tables using CRM profiles is conducted such that properties of a particular area are used to deduce further information in relation to the users located in the particular location area.

According to some embodiments of the invention, analyzing the deciphered tables using CRM profiles is conducted such that properties of a particular categorized user profile are used to deduce further information in relation to the particular location area in which the users are located.

According to some embodiments of the invention, the data processing system further creates tempo-spatial related network-connected devices demographic pattern representations using spatial and temporal geo-statistics techniques. These may include maps exhibiting GIS layers and the like.

According to some embodiments of the invention, the data processing system is further arranged to adjust the demographic pattern representations responsive to client's requirements.

Figure 3:
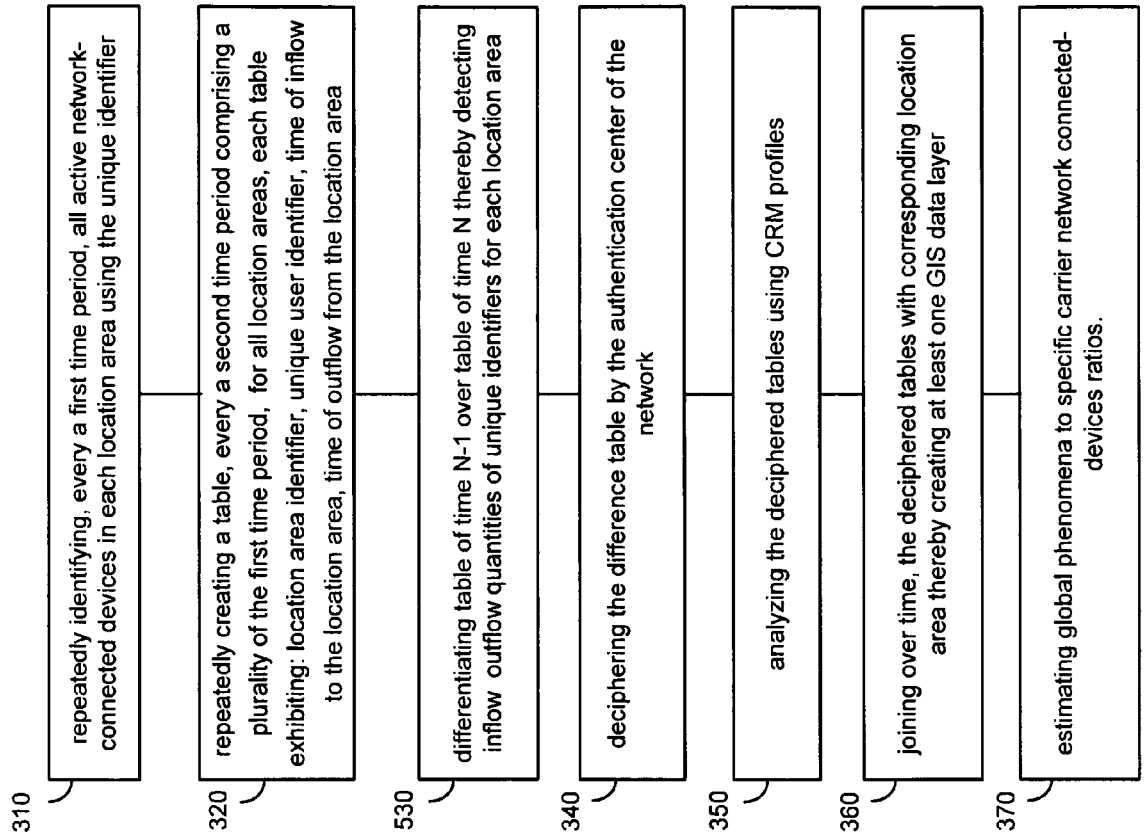
FIG. 3 is a high level flowchart illustrating the method according to some embodiments of the invention.

FIG. 3 is a high level flowchart illustrating the method according to some embodiments of the invention. There is provided a method of using customer relationship management data exhibiting unique user identifiers in a cellular network comprising a plurality of location areas and further in operative association with network-connected devices associated with users, for creating geo-statistical representations of the users. The method comprising: repeatedly identifying, every a first time period, all network-connected devices which are both active and idle in each location area using the unique identifier 310; repeatedly creating a table, every a second time period comprising a plurality of the first time period, for all location areas, each table exhibiting: location area identifier, unique user identifier, time of inflow to the location area, time of outflow from the location area 320; differentiating table of time N−1 over table of time N thereby detecting inflow outflow quantities of unique identifiers for each location area 330; deciphering the difference table by the authentication center of the network; analyzing the deciphered tables using CRM profiles 340; analyzing the deciphered tables using CRM profiles 350; joining over time, the deciphered tables with corresponding location area thereby creating at least one GIS data layer 360; and estimating global phenomena to specific carrier network connected-devices ratios 370.

Advantageously, embodiments of the present invention enable: estimation near real time update ratios, space and time related demographic pattern data and a uniform and repeatable method for acquiring data over wide areas. Additionally the embodiments provide a method of overcoming large amounts of data signaling processing without slowing the cellular network system and a method of extracting demographic data in a non pervasive way to be used in demographic analysis, marketing, network optimization and visualization.

The availability of near real time aggregate data for areal units e.g. cells sectors (or any geographically define hot spots) enable the creation of maps and databases relate to network-connected devices distribution estimation, with high granularity of time-space units.

According to some embodiments of the invention, the method further comprises periodically repeating the aggregating of the combined data thereby creating tempo-spatial data stamps, each exhibiting anonymous aggregated profiles classes associated with geographical locations;

According to some embodiments of the invention, the method further comprises estimating global phenomena in accordance with the tempo-spatial data stamps, in view of the network-connected devices ratios.

According to some embodiments of the invention, the method further comprising creating, using geo-statistical methods a geographic information system (GIS) layer presenting the anonymous aggregated profiles classes associated with geographical locations.

Advantageously, embodiments of the present invention provide non-pervasive sampling method and data processing system enabling to identify and relate customer into a predefined group profiles without overloading the network signaling flow.

Advantageously, the data processing system, computer implemented method and computer program described herein may be used in demographic analysis, marketing, cellular provider network optimization and visualization and combining cellular devices data records with GIS and statistical process.

Advantageously, the availability of up-to-date aggregated data for real units e.g. cells sectors (any geographically define hot spots) enable the creation of maps and databases related to provider's market share distribution estimation exhibiting high granularity of time-space units.

The availability of up-to-date aggregate data for real units e.g. cells sectors (any geographically define hot spots) enable the creation of maps and databases relate to network connected devices (population) distribution estimation with high granularity of time-space units.

Advantageously, use any network related system provider that can locate geographically a device and aggregate the data related to the device by tempo-spatial patterns. Examples for such alternatives can be: ATMs tempo-spatial patterns activity, and distribution of active TV's at home by place and time of the day.

According to some embodiments of the invention, the system can be implemented in digital electronic circuitry, or in computer hardware, firmware, software, or in combinations thereof.

Suitable processors may be used to implement the data processing system, computer implemented method and computer program product. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage devices suitable for tangibly embodying computer program instructions and data include all forms of non-volatile memory, including by way of example semiconductor memory devices, such as EPROM, EEPROM, and flash memory devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implemented data processing system for using customer relationship management (CRM) data exhibiting unique user identifiers in a cellular network comprising a plurality of location areas and further in operative association with network-connected devices associated with users, for creating geo-statistical representations of the users, the system comprising:
   a network-connected devices identifier;
   a CRM data categorizer; and
   a location-based combiner, wherein the a network-connected devices identifier is arranged to:

repeatedly identify, every a first time period, all network-connected devices which are both active and idle in each location area using the unique identifier;

repeatedly create a table, every a second time period comprising a plurality of the first time period, for all location areas, each table exhibiting: location area identifier, unique user identifier, time of inflow to the location area, time of outflow from the location area; and differentiate table of time N−1 over table of time N thereby detecting inflow outflow quantities of unique identifiers for each location area; and wherein the CRM data categorizer is arranged to:

decipher the difference table by the authentication center of the network; and analyze the deciphered tables using CRM profiles; and wherein the location-based combiner is arranged to join over time, the deciphered tables with corresponding location area thereby creating at least one GIS (geographic information system) data layer.

2. A method of using customer relationship management data exhibiting unique user identifiers in a cellular network comprising a plurality of location areas and further in operative association with network-connected devices associated with users, for creating geo-statistical representations of the users, the method comprising:

repeatedly identifying, every a first time period, all network-connected devices which are both active and idle in each location area using the unique identifier;

repeatedly creating a table, every a second time period comprising a plurality of the first time period, for all location areas, each table exhibiting: location area identifier, unique user identifier, time of inflow to the location area, time of outflow from the location area;

differentiating table of time N−1 over table of time N thereby detecting inflow outflow quantities of unique identifiers for each location area;

deciphering the difference table by the authentication center of the network; and analyzing the deciphered tables using CRM profiles.

3. A computer program product, comprising a non-transitory computer usable medium having a computer readable program code embodied therein, the computer readable program code adapted to be executed to implement a method of using customer relationship management data exhibiting unique user identifiers in a cellular network comprising a plurality of location areas and further in operative association with network-connected devices associated with users, for creating geo-statistical representations of the users, the method comprising:

repeatedly identifying, every a first time period, all network-connected devices which are both active and idle in each location area using the unique identifier;

repeatedly creating a table, every a second time period comprising a plurality of the first time period, for all location areas, each table exhibiting: location area identifier, unique user identifier, time of inflow to the location area, time of outflow from the location area;

differentiating table of time N−1 over table of time N thereby detecting inflow outflow quantities of unique identifiers for each location area;

deciphering the difference table by the authentication center of the network; and analyzing the deciphered tables using CRM profiles.

* * * * *